US010019303B2

(12) United States Patent
Uhde et al.

(10) Patent No.: US 10,019,303 B2
(45) Date of Patent: Jul. 10, 2018

(54) METHOD FOR ERROR MONITORING, CONTROL AND DATA TRANSMISSION INSTALLATION AND CONTROL DEVICE

(71) Applicant: Phoenix Contact GmbH & Co. KG, Blomberg (DE)

(72) Inventors: Thorsten Uhde, Hameln (DE); Vinoth Sethuraman, Hameln (DE); Henning Heutger, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 46 days.

(21) Appl. No.: 14/900,235

(22) PCT Filed: Jul. 2, 2014

(86) PCT No.: PCT/EP2014/064060
§ 371 (c)(1),
(2) Date: Dec. 21, 2015

(87) PCT Pub. No.: WO2015/000957
PCT Pub. Date: Jan. 8, 2015

(65) Prior Publication Data
US 2016/0154693 A1 Jun. 2, 2016

(30) Foreign Application Priority Data
Jul. 2, 2013 (DE) .......................... 10 2013 106 954

(51) Int. Cl.
*G06F 11/00* (2006.01)
*G06F 11/07* (2006.01)
(Continued)

(52) U.S. Cl.
CPC ........ *G06F 11/0787* (2013.01); *G06F 11/079* (2013.01); *G06F 11/0709* (2013.01);
(Continued)

(58) Field of Classification Search
CPC .. G06F 11/0766; G06F 11/07; G06F 11/0709; G06F 11/0775; G06F 11/0772;
(Continued)

(56) References Cited

U.S. PATENT DOCUMENTS 5,434,994 A    7/1995  Shaheen et al.
6,615,376 B1 * 9/2003  Olin ...................... G06F 3/0481
                                                              714/25

(Continued)

FOREIGN PATENT DOCUMENTS

AT    012998 U1   3/2013
DE    10030329 C1  1/2002
(Continued)

OTHER PUBLICATIONS

"International Preliminary Report on Patentability", dated Jan. 14, 2016, issued in counterpart International Patent Application No. PCT/EP2014/064060.
(Continued)

*Primary Examiner* — Charles Ehne
(74) *Attorney, Agent, or Firm* — Kaplan Breyer Schwarz, LLP

(57) ABSTRACT

To simplify and/or improve error monitoring in a control and data transmission system for redundant process control, provided is a method for error monitoring in which errors detected by a first control device are stored locally as well as transmitted to at least one redundant second control device, which is arranged remotely, and also stored there so that in each case the error history of both control devices and is available locally for diagnosing the whole redundant system. Further provided is a control and data transmission system designed to carry out the method and a control device for use therein.

10 Claims, 2 Drawing Sheets

(51) Int. Cl.
*G05B 19/042* (2006.01)
*G05B 19/05* (2006.01)
*G06F 11/20* (2006.01)

(52) U.S. Cl.
CPC ...... *G06F 11/0736* (2013.01); *G06F 11/0751* (2013.01); *G06F 11/0772* (2013.01); *G05B 19/0425* (2013.01); *G05B 19/0428* (2013.01); *G05B 19/058* (2013.01); *G05B 2219/24187* (2013.01); *G06F 11/2038* (2013.01); *G06F 11/2048* (2013.01)

(58) Field of Classification Search
CPC ............. G06F 11/0784; G06F 11/0787; G06F 11/3006; G06F 11/3476
See application file for complete search history.

(56) References Cited

U.S. PATENT DOCUMENTS

| | | | | |
|---|---|---|---|---|
| 2002/0129305 | A1* | 9/2002 | Ahrens | G06F 9/45533 714/57 |
| 2003/0126585 | A1* | 7/2003 | Parry | G06F 11/0733 717/124 |
| 2006/0064623 | A1* | 3/2006 | Fischer | G06F 11/0793 714/758 |
| 2008/0082630 | A1* | 4/2008 | Molotchko | G06F 11/2097 709/218 |
| 2015/0018980 | A1* | 1/2015 | Heutger | G05B 19/0428 700/20 |

FOREIGN PATENT DOCUMENTS

| | | |
|---|---|---|
| DE | 102006047026 A1 | 4/2008 |
| DE | 102006047026 B4 | 2/2011 |
| EP | 0111871 A2 | 6/1984 |
| WO | 2013053978 A1 | 4/2013 |

OTHER PUBLICATIONS

"German Office Action", issued in parent patent application No. DE 10 2013 106 954.1, dated Feb. 7, 2014.

"International Search Report and Written Opinion of the International Searching Authority", issued in related International Application No. PCT/EP2014/064060 dated Oct. 22, 2014.

\* cited by examiner

METHOD FOR ERROR MONITORING, CONTROL AND DATA TRANSMISSION INSTALLATION AND CONTROL DEVICE

FIELD OF THE INVENTION

The invention relates to automation technology in general, and in particular to error monitoring in a control and data transmission system having at least two redundant control devices which are connected by means of a communications network to at least one process device which is designed as an input and/or output device, wherein a communications connection exists between the control devices.

BACKGROUND OF THE INVENTION

In automation technology, so-called redundant controllers are used in applications which are designed with high availability, such as a tunnel monitoring system for example. Here, one control device, usually also referred to as a controller, controls the process and the other control device runs in standby mode in order to be able to take over control of the process on the occurrence of certain events. In doing so, the program sequence is reconciled between the control devices by means of a synchronization connection to enable the process to continue to be controlled in the same manner after a changeover. As well as this synchronization of the user program, other information is also exchanged between the control devices in order to ensure consistent operation. Each of the control devices must be informed of the state and function of the other in order to match its own sequence thereto.

By way of example, a redundant control system with control computers and a peripheral unit in which the control computers cyclically output alternating signs of life, wherein the peripheral unit switches to the respective other control computer in the absence of a change in the sign of life, is disclosed in DE 100 30 329 C1.

Further, a control and data transmission system having at least two control devices and at least one slave device which are connected to one another by means of a communications network is described in DE 10 2006 047 026 B4, wherein the slave device contains a plurality of addressable output interfaces for receiving output and status data, and each control device has a device for generating and transmitting status and output data to a separate output interface of the slave device, and wherein the slave device has an evaluation device which controls the forwarding of received output data for further use in response to the status signals received from the control devices.

In general, a redundant control system comprises two control devices, which are synchronized to one another, and subordinated input/output stations, which are connected to the two controllers by means of an appropriate communications network. Typically, one of the two control devices in each case assumes the role of the primary controller, while the other assumes the role of a reserve controller. If an error occurs in the primary controller, the control devices change their roles, i.e. the system switches to the reserve controller, which then becomes the primary controller.

For the purpose of error monitoring, control devices are frequently fitted with LEDs or displays comprising a few characters, by means of which the current operating state or an error state of the respective control device can be signaled.

SUMMARY OF THE INVENTION

The invention is based on the object of disclosing a way in which the error monitoring in a control and data transmission system for redundant process control can be simplified and/or improved.

A core idea of the invention consists in exchanging error information between redundant control devices so that, particularly in the case of control devices which are arranged remotely from one another, the error information of the respective local as well as the remote control device is available on both control devices, and therefore in each case the error history of both control devices is available locally for diagnosing the whole redundant system.

Accordingly, a method for error monitoring in a control and data transmission system designed for redundant process control and having at least one first control device and one second control device, which is redundant with respect to the first and arranged remotely from the first, is provided, wherein the control devices are connected by means of a communications network to at least one process device designed as an input and/or output device, and wherein a communications connection exists between the first and second control device.

It should be noted at this point that the control and data transmission system can be an automation system and the process device can be a field device. Between the first and second control device is a communications connection, wherein this can be established by means of the communications network or via a separate point-to-point connection. The two communications connections can also be used redundantly.

Via the communications connection, the first and second control devices exchange, in particular, data for synchronizing the control programs running on each of the control devices, as well as status data which are used to negotiate the operating state of the respective control device, wherein, in each case, one of the first and second control devices has the operating state of a primary controller and the respective other control device the operating state of a reserve controller. Advantageously, the control devices negotiate their respective operating state automatically via the communications connection which exists between them.

The second control device is arranged remotely from the first control device. It should be noted that a remote arrangement is understood to mean a spatial separation of the control devices, that is to say that the redundant control devices are not arranged in a common housing and, for example, are not coupled via a backplane bus which is a fixed part of the installation, but are arranged as separate devices. Arranged remotely with respect to one another is therefore also understood to mean a first and second control device which are arranged directly adjacent to one another as separate devices. However, the communications connection between the first and second control device can also be designed in such a way that the first and second control devices are able to communicate with one another over large distances, and therefore the control devices can be arranged far apart from one another, for example more than 10, more than 100 or more than 1000 m, or even up to 80 km.

It should be noted that both control devices transmit output data to the process device together with status data, and the process device controls the forwarding of received output data for further use depending on the received status data. Alternatively, it is also conceivable for the control devices to activate the at least one process device only in the operating state of a primary controller, wherein, for this purpose, only the control device in the operating state of a primary controller, for example, transmits output data to the process device.

The method provides that an error is detected by the first control device, wherein an error is preferably detected by processing an error message which is generated by a program running on the control device. In doing so, error messages can, for example, be generated by the control program running on the control device for controlling the process, i.e. for activating the process devices which are designed as input and/or output devices, or also by other programs, such as an operating system or a background program for example. Error messages can relate, for example, to a program error, such as a run-time error, an error when executing a program command or a communications connection error for example. An error when executing a program command can, for example, be detected based on a return value of a program function. An error message can, however, also be transmitted from a process device to the respective control device and relate to an error in the process sequence or in the process device.

Further, the method provides that error information relating to the detected error is stored in the first control device, wherein the error information preferably includes information relating to the type of error, in particular in the form of an error code, information relating to the error time, and/or information relating to the operating state of the first control device. For this purpose, the control device includes an appropriate memory device, which, for example, can be in the form of an overwritable memory, for example RAM, flash memory or EEPROM. The operating state of the first control device indicates in particular whether it is currently being operated in the role of a primary controller or that of a reserve controller.

In addition to local storage of the error information in the first control device, the method provides that the error information is transmitted from the first to the second control device and is stored in the second control device. In doing so, in particular, the error information is stored in the second control device for a long period, i.e. for longer than is necessary to process the error information. Storage for a long period is therefore to be seen, for example, as storage in a non-volatile memory or also storage in a volatile memory for the duration of the operation of the control device.

Advantageously, the method can also be carried out with the roles of the first and second control device interchanged, so that the two control devices have the same functionality.

In a particularly preferred embodiment of the method, it is provided that the error information is stored in at least one error list in the first and in the second control device, wherein in particular the detected errors, sorted by error time, or the detected types of error, sorted by frequency of their occurrence, are stored in the error list. Storage of an error in the error list includes the storage of a list entry which includes error information relating to this error.

Advantageously, all errors detected by the respective control device are stored in the error list which is sorted by error times. In order to reduce the memory requirement, the error list can be limited to a specified number of entries, for example five or ten, so that only the most recently detected errors are stored in the error list at any one time. As however, in the case of frequent occurrence of a certain error, this can lead to another detected error being deleted from the error list after just a short time, it can advantageously be provided that an error list in which the detected types of error are listed is stored. Advantageously, this error list can also be limited to a specified number of entries. Particularly preferably, the detected errors of an error type or an error code are counted, and the frequency with which an error of the particular error type has occurred is stored in the respective list entry for this error type.

Particularly advantageously, both of the types of error list for each control device described above are in each case stored in each control device.

Advantageously, the corresponding error lists stored in the first and in the second control device are reconciled at specified time intervals. Here, corresponding error lists are error lists of the same kind, in which, in each case, error information relating to errors which have been detected by the same control device is stored. Alternatively, or in addition, the error lists stored in the first and in the second control device can advantageously be updated on every detected error, wherein, for this purpose, depending on the error information relating to the detected error, the error list stored in the local control device is updated and also the error information is transmitted to the remotely arranged control device and the corresponding error list there is updated.

For diagnostic purposes, each control device preferably includes a display for displaying the error information or the error lists. Accordingly, particularly advantageously, the method provides that the error information relating to an error detected by one of the control devices, or an error list based on this error information, is displayed on a display of the respective control device.

This is particularly advantageous, for example for maintenance purposes, in the case of control devices which are arranged far apart from one another, to be able to visually display the error information, both for the local and for the remote control device, locally at the place at which one of the two control devices is installed. Further, advantageously, in the event of a failure of one of the two control devices, the error history of the failed control device can be displayed locally on the other control device. This is also advantageous when the control devices are arranged directly adjacent to one another for example.

Accordingly, a control and data transmission system for redundant process control having at least one first control device and one second control device, which is redundant with respect to the first and arranged remotely from the first, which are connected by means of a communications network to at least one process device designed as an input and/or output device, is provided, wherein a communications connection exists between the first and second control device, and each of the control devices is designed to detect errors and to store error information relating to detected errors. Further, each of the control devices is designed to transmit error information relating to errors detected by this control device via the communications connection to the respective other control device, and to store error information received from the respective other control device for a long period.

In advantageous embodiments, the control and data transmission system is in each case designed to carry out the advantageous embodiments of the method described above.

A control device for use in a control and data transmission system described above, which is designed to receive and store for a long time error information relating to errors detected by another identical control device from the other control device via a communications connection, also lies within the scope of the invention.

The embodiments of the invention described above can advantageously be combined in any way.

BRIEF DESCRIPTION OF THE DRAWINGS

By way of example, the invention is described in more detail below based on preferred embodiments and with reference to the attached drawings. Here, the same references in the drawings designate the same or similar parts. In the drawings.

DETAILED DESCRIPTION

Figure 1:
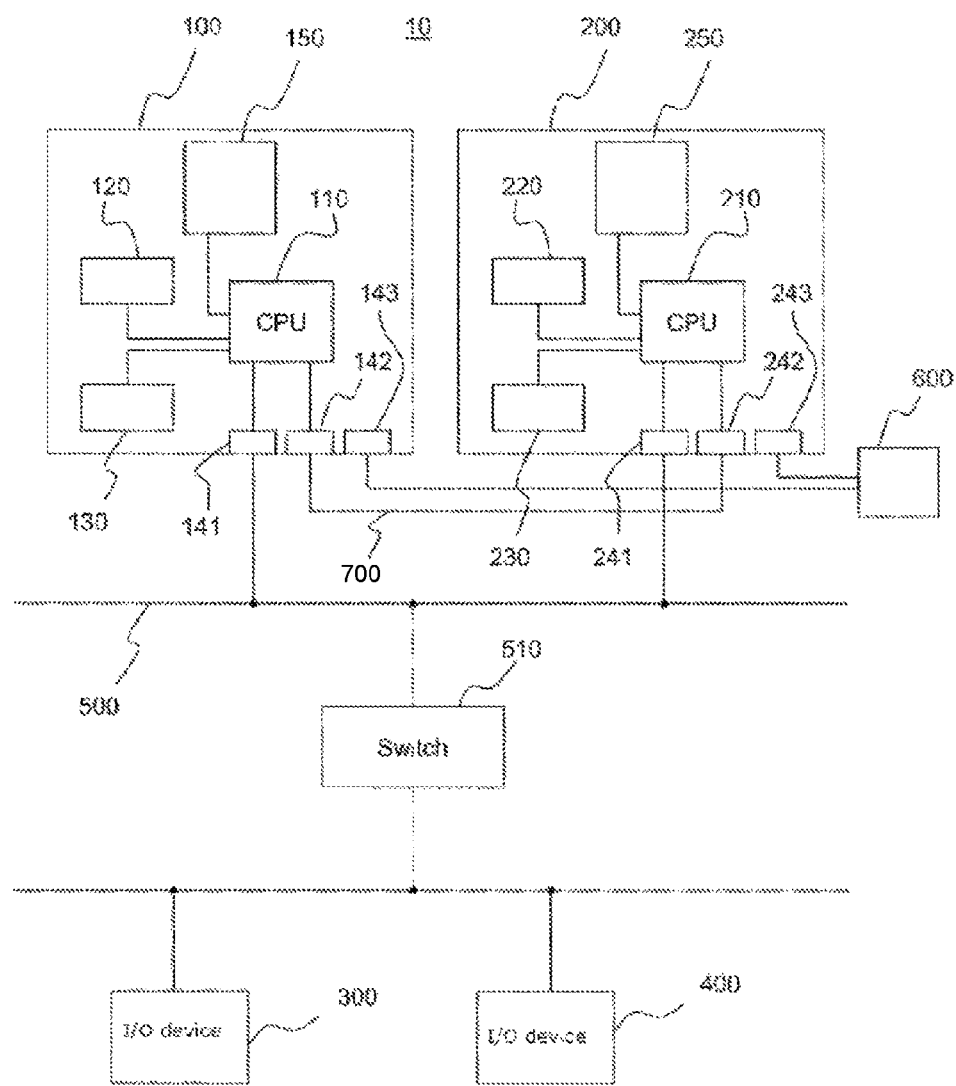
FIG. 1 shows a schematic diagram of a preferred embodiment of a control and data transmission system.

An exemplary control and data transmission system 10, which is used, for example, in automation technology or tunnel monitoring, is shown in FIG. 1. In the exemplary embodiment shown, the control and data transmission system 10 includes two redundant control devices 100 and 200, which are connected by means of a communications network 500 to process devices 300 and 400. The communications network 500 can include further components, such as the switch 510 shown for example, and, in the exemplary embodiment shown, is designed as a PROFINET communications network. PROFINET (Process Field Network) is an open industrial Ethernet standard used in the field of automation. However, any other suitable communications network, such as a field bus for example, can also be used.

The control devices 100 and 200 in each case include a memory 120 and 220 respectively in which, in each case, a control program is stored, which in each case can be executed by means of a processor 110 and 210 respectively. The control devices 100 and 200 are in each case connected via an Ethernet interface 141 and 241 respectively to the PROFINET network 500. Further, the control devices 100 and 200 are connected to one another by means of additional interfaces 142 and 242 via a direct connection 700. The direct connection 700 can be designed as an Ethernet-based fiber-optic cable connection, and the interfaces 142 and 242 accordingly as fiber-optic cable interfaces. However, any other kind of direct connection also lies within the scope of the invention. Synchronization of the control programs in each case executed by the control devices 100 and 200 is carried out via the connection 700. Status data can also be exchanged via the connection 700, so that the control devices are in each case informed of the operating state of the respective other control device and are able to detect a failure of the respective other control device.

Further, the control devices 100 and 200 in each case include an error memory 130 and 230 respectively for storing error information in the form of error lists. The memories 120 and 220, and also the error memories 130 and 230, can be designed as overwritable memories, for example RAM, flash memory or EEPROM.

As, in the exemplary embodiment shown, the control devices 100 and 200 are in the form of programmable logic controllers (PLCs), these are also referred to below as controller or as redundant controller.

The two redundant controllers 100 and 200 are configured such that one is of the FIRST type and one of the SECOND type and the controllers are therefore identifiable as first (FIRST) and second (SECOND) controller. This allocation remains constant over the run time, while the roles of the controllers as primary controller and as reserve controller can change. A preferred selection can be provided in such a way that, in normal mode, the FIRST type controller takes on the role of primary controller and the SECOND type controller the role of reserve controller.

If a synchronization connection exists, the respective role can be directly negotiated between the controllers 100 and 200. The redundant controllers are designed as separate devices which are spatially separate from one another, wherein they can be arranged directly adjacent to one another for example. However, depending on the application, the distance between the redundant controllers can also be very great, for example it can be more than 10, more than 100 or more than 1000 m, or even up to 80 km. Communication with the subordinated I/O stations 300 and 400 takes place via the Ethernet-based PROFINET protocol. In doing so, each of the two controllers 100 and 200 has established a communications connection to each of the projected I/O stations 300 and 400 in normal operation.

In order to display error information, the control devices 100 and 200 in each case include a display 150 and 250 respectively which is designed to display at least one error list. The maximum number of list entries of an error list that can be displayed simultaneously is dependent on the size of the display 150 and 250 respectively. To enable a clear display, the display 150 or 250 respectively is preferably designed in such a way that at least two list entries, preferably at least five or at least ten list entries, can be displayed simultaneously without having to scroll between a plurality of display pages. In the exemplary embodiment shown, the displays 150 and 250 are designed as high-resolution displays. Further advantageously, a touch screen function can be provided for the displays 150 and 250 for user entries.

For error diagnosis, error messages which have accumulated in one of the control devices 100 and 200 respectively can be displayed in the form of error codes as well as in plain text on the particular display 150 and 250 respectively. Advantageously, the accumulated error information is stored in the history and displayed in lists which, on the one hand, display the 10 most recent errors for example and, on the other, the 10 most frequent errors for example, in order to give an overview of the system function directly at the device.

If, however, only the locally accumulated error information were displayed in each case, then no overall diagnosis of the redundant system would be possible. This would not be advantageous in a high-availability system such as a control and data transmission system for redundant process control. In particular, after switching the role of primary controller to reserve controller, the accumulated error information would only be present on the controller which no longer controls the process. Two different error lists, which would not necessarily correlate with one another, would therefore be generated.

To enable overall redundancy-related diagnosis of the redundant system 10, the control devices 100 and 200 are therefore designed to transmit pending error information to the respective partner controller so that this error information is available and can be displayed in a suitable manner on both sides, on the part of the respective local control device and on the part of the control device remote therefrom.

The error lists are processed and provided with additional information to enable an overview of the overall system. In the case of the list of most recent error entries, the information as to which error code is present, a timestamp when the error occurred, and which role the controller had adopted at the time of occurrence, primary controller or reserve controller, is therefore stored. In the list of most frequent errors, the error code and the number of error entries are stored and sorted by frequency.

Advantageously, the reconciliation of the error information is automated by an extension of a protocol for automatic synchronization. The currently pending errors are transmitted between the two controllers. In addition, the two error lists of the two controllers are cyclically reconciled between the controllers 100 and 200 and are therefore available for display on both sides of the synchronization connection. The lists can be displayed both as an error code and as a plain text message. For this purpose, each of the controllers 100 and 200 has a corresponding assignment option, in particular in the form of a stored assignment table in which a brief error description is assigned to each permissible error code.

Advantageously, for the reconciliation of error information, only the error code and not the plain text is transmitted along with the additional information such as time, role and frequency, in order to minimize the quantity of list data for reconciliation between the controllers 100 and 200.

With the help of this method, the current error lists of the local and the remote controller are now always present on both controllers 100 and 200 so that a full history is available on both controllers and, with the information relating to error type or error code, time and role of the controller on the occurrence of the error and the information relating to error frequency, the behavior of the overall redundant system 10 can be diagnosed on both controllers 100 and 200.

Preferably, it can be provided that the lists are deleted in order to set a defined starting point for recording the information.

Further, it is advantageously provided that the error lists of the primary controller are read out with a diagnostic tool and therefore the full diagnostic information of the overall system is available on an engineering computer 600 as well as embedded in a visualization. For this purpose, the control devices 100 and 200 can in each case be connected to the engineering computer 600 by means of interfaces 143 and 243 respectively.

A variant consists in that the lists are only reconciled when a new error has occurred and the content of the lists has therefore changed. As a result, the bandwidth in the communication between the two redundant controllers 100 and 200 required for this reconciliation can be minimized.

Figure 2:
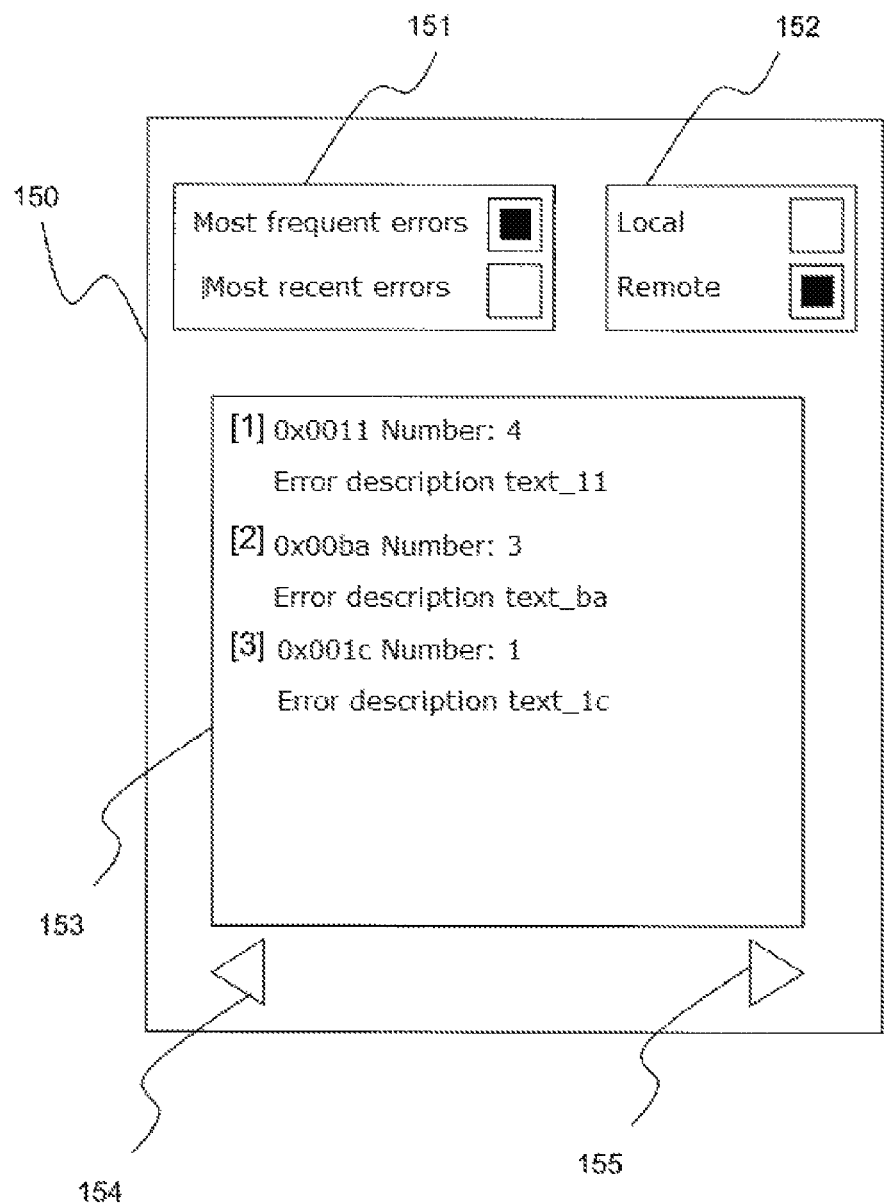
FIG. 2 shows a schematic diagram of a display of a control device for displaying error lists.

The display on the display 150 of the control device 100 is shown by way of example in FIG. 2.

As described above, each of the controllers 100 and 200 also maintains at least one error list of the respective other controller. In the example shown, the controller 100 maintains two types of error list, one list of the most recent errors and one list of the most frequent errors, wherein the control device 100 maintains its own error list and an error list for the remote controller 200 for each type of error list.

One of the controller's own error lists or one of the error lists for the other controller can optionally be displayed on the display 150. For this purpose, a button 151 is provided for selecting the "Most recent errors" or "Most frequent errors" type of error list, and a button 152 for selecting the respective error list for the local controller, i.e. in the example shown, the controller 100, or the remote controller, i.e. in the example shown, the controller 200. The list entries for the "Most recent errors" type of error list are preferably displayed sorted chronologically by time of occurrence of the respective error starting with the most recent error, and the list entries for the "Most frequent errors" type of error list are preferably displayed sorted by frequency of occurrence of the respective type of error starting with the most frequent error.

In the example shown, the "Most frequent errors" error list for the remote controller is selected. This error list 153 is therefore displayed on the display 150. In the example shown in FIG. 2, up to five list entries can be displayed simultaneously. If the respective list contains a larger number of entries, then, in the example shown, it is possible to scroll between a plurality of pages, wherein control is carried out with the help of the buttons 154 and 155.

If the display were large enough, it would also be conceivable to display several or all error lists simultaneously.

When controllers are a long way apart, the operator therefore has the option of having not only the error list or the error lists of the respective local controller at the place where he is located displayed on this controller, but also the errors of the far distant controller. Further, in the event of a failure of one of the controllers, the operator has the option of having the error list or the error lists of the failed controller displayed on the respective other controller.

What is claimed is:

1. A method for error monitoring in a control and data transmission system designed for redundant process control, the control and data transmission system having a first control device and a second control device, which is redundant with respect to the first control device, and arranged remotely from the first control device, a communications connection connecting the first control device and the second control device, and a communications network connecting the first control device and the second control device to at least one process device configured as an input or an output device, the method for error monitoring comprising:
   detecting an error with the first control device;
   storing error information relating to the detected error in the first control device in at least one error list;
   transmitting, via the communications connection, the error information from the first control device to the second control device;
   storing the error information received from the first control device in the second control device in the at least one error list; and
   reconciling, via the communications connection, the at least one error list stored in the first control device and in the second control devices at specific time intervals.

2. The method according to claim 1, wherein the error information includes information relating to a type of error.

3. The method according to claim 1, wherein the error list includes at least one of the detected errors, sorted by an error time, and the detected types of error, sorted by frequency of their occurrence.

4. The method according to claim 1, wherein the error lists stored in the first control device and in the second control device are updated on every detected error.

5. The method according to claim 1, wherein one of the error information or the at least one error list is displayed on a display of the second control device.

6. A control and data transmission system designed for redundant process control, the control and data transmission system comprising:
   one first control device having at least one error list;
   one second control device, which is redundant with respect to the first control device and arranged remotely from the first control device, the one second control device having at least one error list;
   a communications connection connecting the one first control device and the one second control device;
   at least one process device configured as at least one of an input or an output device; and a communications network connecting the one first control device and the one second control device to the at least one process device;

wherein each of the one first control device and one second control device are each configured to detect errors and to store error information relating to detected errors in its respective at least one error list, transmit the error information relating to the detected errors with the communications connection to the respective other one of the one first control device and the one second control device, store the error information received from the respective other one of the one first control device and the one second control device for a long period in its at least one error list, and reconcile, via the communications connection, the at least one error list of the one first control device with the at least one error list of the one second control device at specified time intervals.

7. A control device for use in a control and data transmission system according to claim 6, designed to receive and to store for a long time error information relating to errors detected by another identical control device transmitted from the other control device via a communications connection, and configured to store the error information in at least one error list, and reconcile the stored at least one error list with another error list stored in the other identical control device at specified time intervals.

8. The method of claim 1, wherein the error information includes information relating to a type of error in the form of an error code.

9. The method of claim 1, wherein the error information includes information relating to the error time.

10. The method of claim 1, wherein the error information includes information relating to the operating state of the one first control device.

* * * * *